A. C. SEIBEL.
BRICK CHEESE CUTTER.
APPLICATION FILED NOV. 15, 1909.
954,052.
Patented Apr. 5, 1910.
2 SHEETS—SHEET 1.
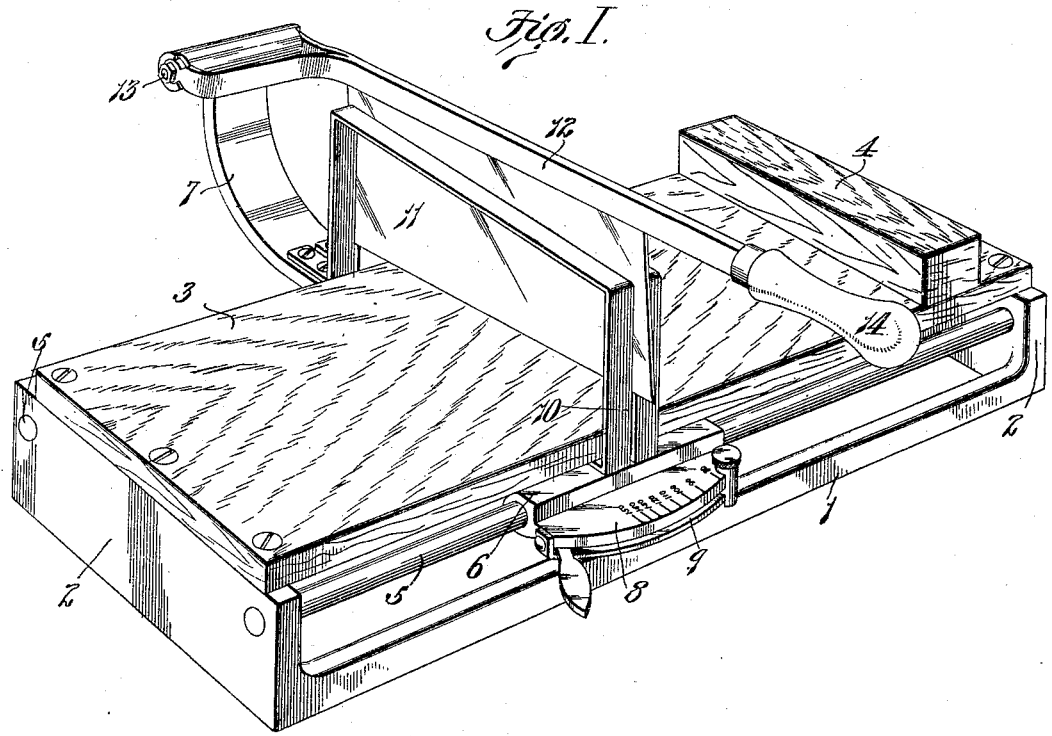
Fig. I.
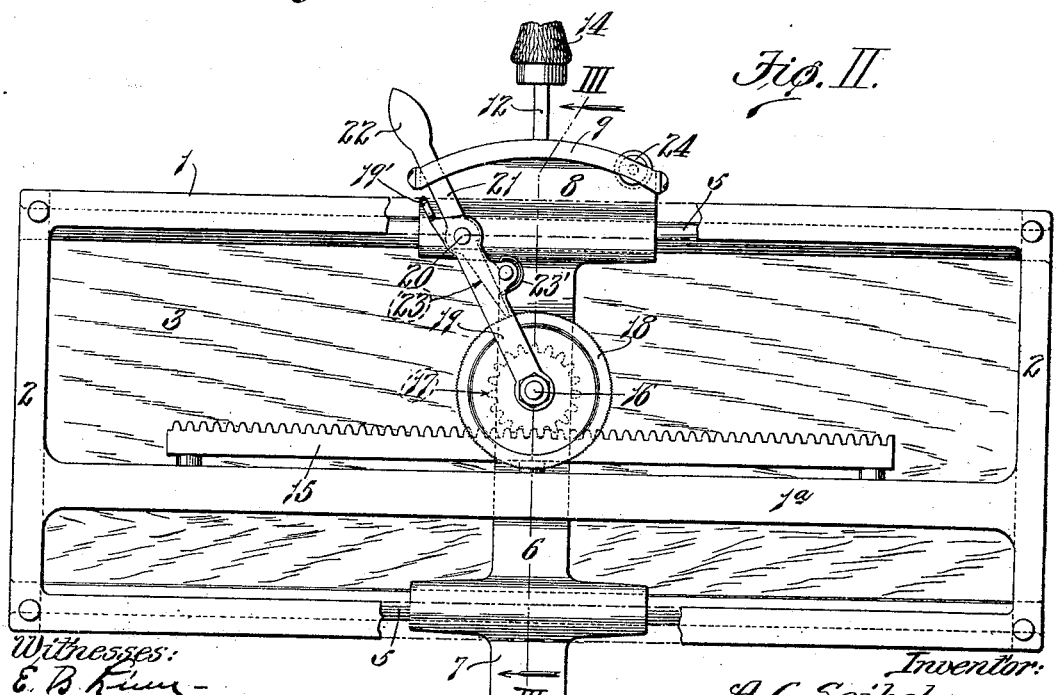
Fig. II.

A. C. SEIBEL.
BRICK CHEESE CUTTER.
APPLICATION FILED NOV. 15, 1909.
954,052.
Patented Apr. 5, 1910.
2 SHEETS—SHEET 2.
Fig. III.
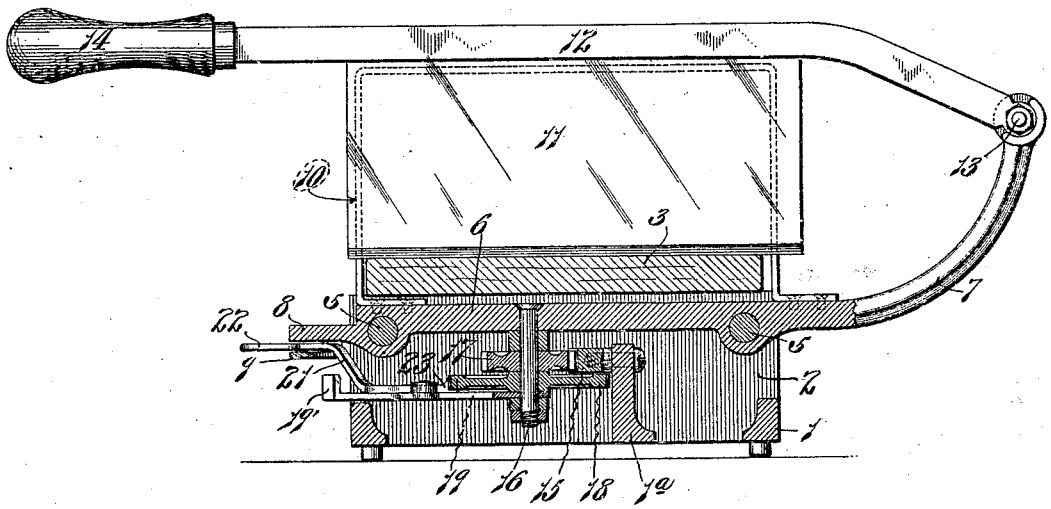
Fig. IV.
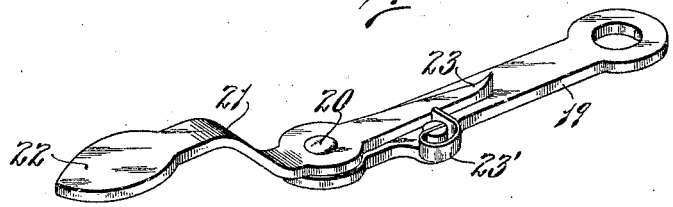
Fig. V.
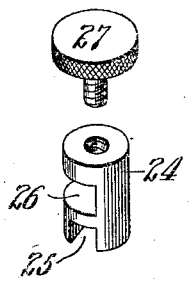
Witnesses:
E. B. Linn
A. J. McCauley
Inventor:
A. C. Seibel.
By E. Knight Atty.

UNITED STATES PATENT OFFICE.

ALBERT C. SEIBEL, OF EAST ST. LOUIS, ILLINOIS, ASSIGNOR OF SEVEN-EIGHTHS TO ARTHUR PENSONEAU, OF FRENCH VILLAGE, ILLINOIS.

BRICK-CHEESE CUTTER.

954,052.   Specification of Letters Patent.   Patented Apr. 5, 1910.

Application filed November 15, 1909. Serial No. 528,045.

*To all whom it may concern:*

Be it known that I, ALBERT C. SEIBEL, a citizen of the United States of America, residing at East St. Louis, in the county of St. Clair and State of Illinois, have invented certain new and useful Improvements in Brick-Cheese Cutters, of which the following is a full, clear, and exact description, reference being had to the accompanying drawings, forming part of this specification.

My invention relates to a device for use in cutting brick cheese into slices of specific widths and it has for its object the production of a cutter of this description that is of extremely efficient construction and which, while providing for the cutting of slices of various widths, involves great simplicity to this end.

Figure I is a perspective view of my brick cheese cutter. Fig. II is an inverted plan view of the cutter, with a portion of the movable carrier and the handle by which the cutting blade is operated broken away. Fig. III is a vertical transverse section taken on line III—III, Fig. II. Fig. IV is an enlarged perspective view of the operating lever device. Fig. V is a perspective view of the adjustable gage stop, with the parts comprising this stop separated from each other.

In the accompanying drawings:—1 designates a base frame of my cheese cutter provided with end uprights 2.

3 is a table mounted on the base frame and secured at its ends to the end uprights of said frame, the table being surmounted near one end with a stop 4 against which one end of the brick cheese placed upon the table may rest while the cheese is being cut.

5 are guide rods extending longitudinally of the base frame and mounted at their ends in the end uprights of the frame, these guide rods being arranged parallel with each other and one of them being at the front of the cutter, while the other is at the rear of the cutter.

6 designates a carrier loosely mounted upon the guide rods 5 and extending transversely beneath the table 3, the carrier being provided at its rear end with an upwardly projecting arm 7 and at its front end with an extension piece 8 that juts forwardly at the front of the cutter and is of service as a gage for the cheese cutting operations, there being a scale produced upon the surface of the extension piece, as seen in Fig. I, and which is made use of in my machine, as will be hereinafter more particularly explained. 9 is a supporting strap located beneath the extension piece 8 and extending longitudinally of the cutter.

10 designates a slotted guide extending transversely of the cutter and carried by the carrier 6. This slotted carrier is secured at its rear end by attachment to the arm 7 of the carrier and at its forward end by attachment to the carrier at its front end, and it is made of inverted U-shape in order that when the carrier is shifted longitudinally of the cutter, the guide will straddle the brick of cheese resting upon the table 3.

11 designates a cutting blade that is carried by a lever 12 pivoted at 13 to the upper end of the rear arm of the carrier 6 and which is provided at its forward end with a handle 14. The lever 12 is adapted to be raised and lowered by its handle so that the cutting blade, which is positioned within the slotted guide 10 will operate therein in a straight downward path to cut through the cheese laid upon the table 3.

At the under side of the cutter and extending longitudinally of the base frame is a rib 1ª. This rib has secured to it a horizontal rack bar 15 that extends longitudinally of the cutter and the teeth of which are located at the front of the bar. 16 is a vertical shaft or stud carried by the carrier 6 and extending downwardly therefrom in front of the horizontal rack bar 15, as seen in Figs. II and III.

17 is a horizontal pinion loosely mounted upon the shaft 16 and having conjoined to it a horizontal ratchet wheel 18. The pinion 17 is arranged in mesh with the rack bar 15, while the ratchet wheel, in conjunction with other appliances to be presently described, serves as a means for rotating the pinion in order that it will, by coöperating with the rack bar, act to impart movement to the carrier 6 longitudinally of the cheese cutter.

19 is a horizontal lever loosely fitted at its rear end to the shaft 16 and which has pivoted to it at 20 a hand lever 21. The pivotal connection of the hand lever to the lever 19 is at a point intermediate of the ends of said hand lever, as seen most clearly in Fig. IV, and the handle 22 of said hand lever is loosely positioned and operable between the extension piece 8 of the carrier 6 and the supporting strap 9 beneath this extension piece, while at the rear end of the operating lever is a pawl 23 that engages the ratchet wheel 18 and is held in position against the teeth of said wheel by a spring 23' carried by the lever 19.

24 designates an adjustable stop associated with the extension piece 8 of the carrier 6 and which serves to limit the degree of movement of the hand lever 21 by which the ratchet wheel 18 is operated. This stop block is provided at its lower end with a slot 25 in which the supporting strap 9 is seated and which is provided with a horizontal slot 26 that permits of the block being loosely fitted to the extension piece 8.

27 is a clamping screw operable in the stop block at its upper end and adapted to bear against the upper surface of the extension piece in order that the stop block may be held from movement in any position to which it may be adjusted.

In the practical use of my cheese cutter, the brick cheese to be cut is placed upon the table 3 of the cutter between the stop 4 surmounting said table and the vertical line occupied by the carrier 6 and the parts associated with it when said carrier is at the end of the cutter farthest removed from the stop. The carrier is then shifted toward the cheese by the actuation of the hand lever 21 which, upon being operated, causes its pawl to impart rotation to the ratchet wheel 18 and the pinion 17 conjoined to the ratchet wheel and coöperating with the stationary rack bar 15. After the carrier has been sufficiently moved in the direction indicated to bring the cutting blade 11 to the end of the brick of cheese, the stop block 24 is adjusted along the scale on the extension piece 8 of the carrier until it is in a position to restrict the degree of throw of the hand lever 21 according to the thickness of slices that are to be cut from the cheese, it being assumed that the hand lever is at this time in the position illustrated in Fig. I. The cutting blade lever is then elevated sufficiently to provide for the cutting blade passing over the top of the cheese and upon a forward movement of the hand lever until it strikes the stop block, the carrier 6 will be moved longitudinally of the cheese cutter until the blade will be in a position to cut a slice from the cheese that is of the predetermined thickness. Thereafter, upon the rearward and forward movements of the hand lever, the carrier will be advanced in each operation to provide for the cutting blade being brought to the proper position to cut each slice of a thickness corresponding to the thickness of the first slice.

To restore the carrier to the end of the cheese cutter farthest from the stop 4, subsequent to its advance movement, it is necessary to throw the pawl of the operating lever 21 out of engagement with the ratchet wheel 18 and then draw the carrier backward. To permit of the disengagement of the pawl from the ratchet, I provide the lever 19 with a thumb piece 19' that extends to the front of the machine and against which the thumb of the operator may be placed while a pull is being exerted upon the handle of the hand lever 21, thereby providing for the lever 19 being thrown in one direction while the hand lever thrown in the opposite direction and its pawl is freed from the ratchet wheel to permit free rotation of the ratchet wheel and the pinion associated with it during the return movement of the carrier.

I claim:—

1. In a cutter of the character described, the combination of a support for the object to be cut, a pair of longitudinally arranged parallel guide rods beneath said support, a knife carrier slidable transversely of the cutter on said parallel guide rods, a transversely arranged knife pivoted to said knife carrier and operable above the support, a horizontally arranged gear carried by said knife carrier, a stationary member parallel with said guide rods and with which said gear is coöperable, and means for rotating said gear to cause it to impart movement to said knife carrier longitudinally of said support.

2. In a cutter of the character described, the combination of a support for the object to be cut, a knife carrier movably supported beneath said support, a knife pivoted to said carrier and operable above the support, a gear carried by said carrier, a stationary member with which said gear is coöperable, a ratchet wheel conjoined to said gear, a lever mechanism for operating said ratchet wheel to impart rotation to the gear and cause it to impart movement to said carrier longitudinally of said support.

3. In a cutter of the character described, the combination of a support, for the object to be cut, a knife carrier movably supported beneath said support, a knife pivoted to said carrier and operable above the support, a gear carried by said carrier, a stationary member with which said gear is coöperable, a ratchet wheel conjoined to said gear, a lever loosely mounted adjacent to said ratchet wheel, and an operating lever pivoted to said first mentioned lever and having a pawl for engagement with said ratchet wheel to impart rotation thereto.

4. In a cutter of the character described, the combination of a support for the object to be cut, a carrier movably mounted beneath said support, a cutting knife hinged to said carrier, a stationary gear member beneath said support, a shaft carried by said carrier, a pinion loosely fitted to said shaft and meshing with said stationary gear member, a ratchet wheel conjoined to said pinion, a lever pivoted to said shaft adjacent to said ratchet wheel, and an operating lever pivoted to said first mentioned lever and having a pawl engaging said ratchet wheel and adapted to impart rotation thereto upon the actuation of said operating lever.

ALBERT C. SEIBEL.

In the presence of—
FRANK DELALOYE,
FRANK DURHAM.